United States Patent [19]

Ishitsuka

[11] Patent Number: 5,410,440
[45] Date of Patent: Apr. 25, 1995

[54] RESINOUS DISC CARTRIDGE CONTAINING AN ESTER COMPOUND OF GLYCERIN

[75] Inventor: Yasuhiro Ishitsuka, Chiba, Japan

[73] Assignee: Hitachi Maxell, Ltd., Osaka, Japan

[21] Appl. No.: 971,471

[22] Filed: Nov. 4, 1992

[51] Int. Cl.⁶ ............................................. G11B 23/03
[52] U.S. Cl. ...................................................... 360/133
[58] Field of Search .................. 360/132, 133; 369/291

[56] References Cited

U.S. PATENT DOCUMENTS

| | | | |
|---|---|---|---|
| 4,901,180 | 2/1990 | Oishi | 360/133 |
| 5,084,862 | 1/1992 | Fujita et al. | 360/133 |
| 5,121,380 | 6/1992 | Fujita et al. | 360/133 |

Primary Examiner—Robert S. Tupper
Attorney, Agent, or Firm—Birch, Stewart, Kolasch & Birch

[57] ABSTRACT

A disc cartridge including a recording disc, a cartridge case in which the recording disc is housed rotatably and a head inserting opening is formed at a predetermined location, and a synthetic resin-made shutter adapted to open and close the head inserting opening in the cartridge case, wherein the cartridge case and the shutter contain an ester compound of glycerin and optionally an amine type organic compound.

6 Claims, 1 Drawing Sheet

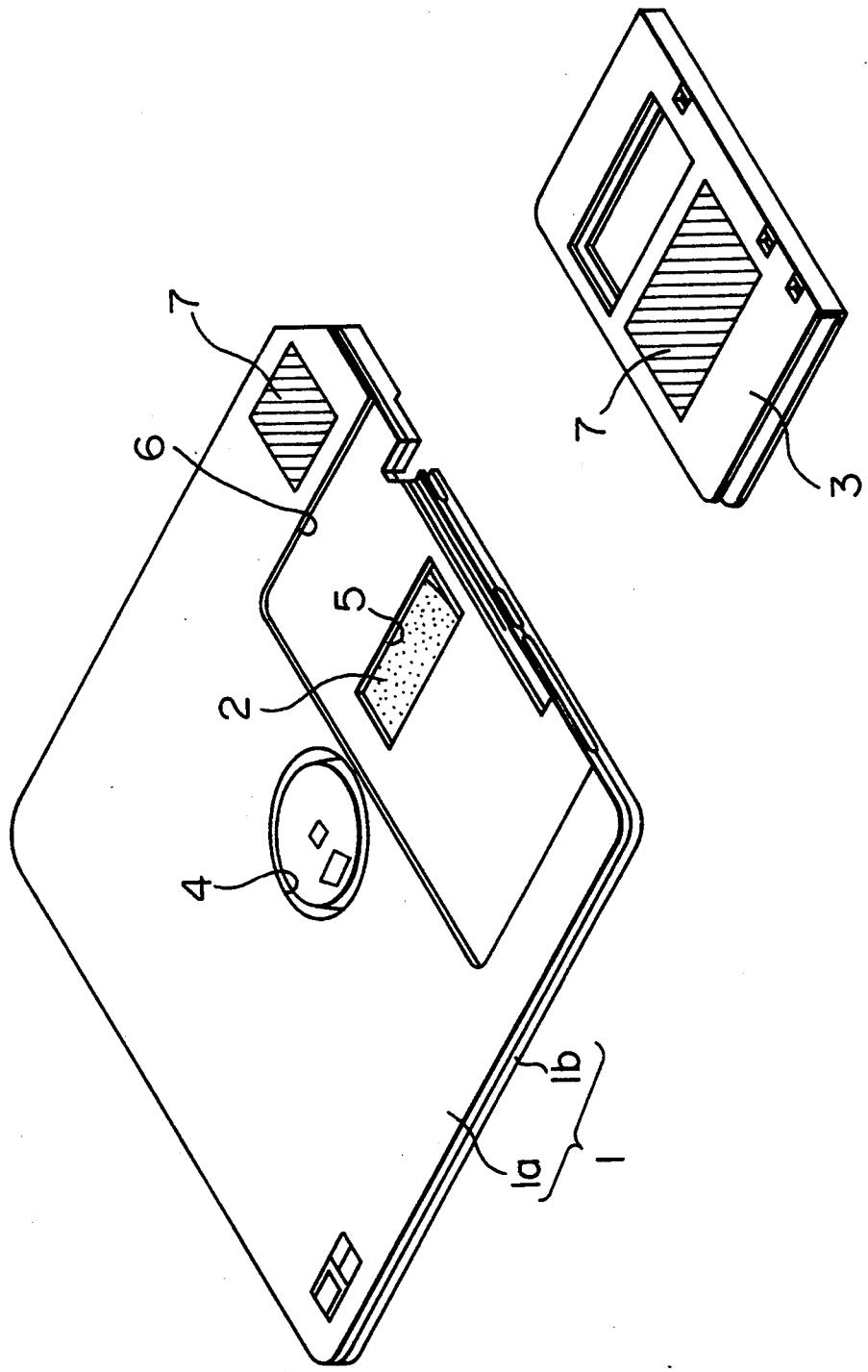
FIG. I

RESINOUS DISC CARTRIDGE CONTAINING AN ESTER COMPOUND OF GLYCERIN

BACKGROUND OF THE INVENTION

1. Field of the Invention

This invention relates to disc cartridges such as a magnetic disc cartridge, photodisc cartridge and photomagnetic disc cartridge. More particularly, the invention pertains to the material of the cartridge case and the shutter adapted to slidably engage therewith so as to open and close the head insertion opening in the cartridge case.

2. Discussion of the Related Art

A magnetic disc cartridge consists principally of a cartridge case in which a head insertion opening and an opening for accommodating a drive shaft are formed, a flexible magnetic disc housed rotatably in the cartridge case, a cleaning sheet secured to the inside of the cartridge case, and a shutter designed to open and close the head insertion opening in said cartridge case.

As material of the cartridge case, synthetic resins such as ABS resin, styrene resin, acrylic resin and the like have been used.

Use of a metallic shutter has the problem that as the shutter repeats its reciprocating motion, the surfaces of the cartridge case are scratched by the edges of the shutter to produce wear material, and when this wear material gets into the inside of the cartridge case and adheres to the magnetic disc surface or the magnetic head, it produces a bad effect on the recording and reproduction and become the cause of errors. For avoiding this problem, a synthetic resin-made shutter is generally used to eliminate or minimize the risk of generating wear material.

The cartridge case and the shutter which are made of synthetic resin tend to adsorb dust and contaminants in the air, and such adsorbed dust and contaminants often enter the cartridge case to become the cause of errors. It has therefore been attempted in various ways to add an antistatic agent to the cartridge case and the shutter.

Amine type organic compounds have been generally used as this type of antistatic agent, but the addition of such conventional antistatic agents to the cartridge case and the shutter would adversely affect their printability.

Usually, certain indications, such as front side and flip side, type of disc cartridge, trade marks and other commercial designs are printed on the surfaces of the cartridge case and the shutter, but when their printability is deteriorated, as mentioned above, the printing ink does not spread well and the printed indications could become blurred or disappear from the cartridge and/or shutter surfaces.

SUMMARY OF THE INVENTION

The objects of the present invention is to eliminate these defects of the prior art and to provide a high-quality disc cartridge which has excellent printability as well as an antistatic effect.

In order to accomplish these objects, the present invention provides a disc cartridge comprising a recording disc, a cartridge case in which the recording disc is rotatably housed and a head including insertion opening formed at a predetermined position therein, and a shutter adapted to open and close the head insertion opening in the cartridge case, the shutter being made of a synthetic resin, such as polypropylene, and containing at least an ester compound of glycerin, such as glycerin monostearate.

For attaining the above objects, the present invention further provides a disc cartridge comprising a recording disc, a cartridge case in which the recording disc is rotatably housed, the cartridge case having a head insertion opening formed at a predetermined position, and a shutter adapted to open and close the head insertion opening in the cartridge case, the shutter containing at least a mixture of an ester compound of glycerin, such as glycerin monostearate, and an amine type organic compound, such as N-N-bishydroxyalkylamine containing a polyhydric alcohol monoester.

Further, for achieving these objects, the present invention is further intended to provide a disc cartridge comprising a recording disc and a cartridge case in which the recording disc is housed rotatably and a head insertion opening formed at a predetermined position, the cartridge case being made of a synthetic resin, such as polypropylene and also containing at least an ester compound of glycerin, such as glycerin monostearate.

The present invention further provides a disc cartridge comprising a recording disc and a cartridge case in which the recording disc is rotatably housed having a head insertion opening formed thereon at a predetermined position, the cartridge case being made of a synthetic resin and also containing at least a mixture of an ester compound of glycerin, such as glycerin monostearate, and an amine type organic compound, such as N-N-bishydroxyalkylamine.

According to the present invention, as mentioned above, an ester compound of glycerin, such as glycerin monostearate, or a mixture thereof with an amine type organic compound, such as N-N-bishydroxyalkylamine, is contained in the cartridge case or the shutter to improve their printability.

It is notable that the ester compounds of glycerin such as glycerin, monostearate, and the amine type organic compounds, such as N-N-bishydroxyalkylamine, have good compatibility with polypropylene used as base material of the cartridge case or the shutter according to this invention, so that such additives can exhibit their excellent properties to the fullest measure.

BRIEF DESCRIPTION OF THE DRAWING

FIG. 1 is a partly exploded perspective view of a magnetic disc cartridge according to an embodiment of the present invention.

DETAILED DISCUSSION

As shown in FIG. 1, the magnetic disc cartridge in accordance with an embodiment of this invention comprises a cartridge case 1, a magnetic disc 2 housed rotatably therein, a shutter 3 adapted to the cartridge case 1 so as to be slidable relative to each other, and a cleaning sheet (not shown) secured to the inside of the cartridge case 1.

The cartridge case 1 comprises an upper half case 1a and a lower half case 1b, and both are made by injection molding with a hard synthetic resin, such as polypropylene, ABS resin, styrene resin, acrylic resin or the like.

Approximately at the center of the lower half case 1b is formed an opening 4 for accommodating the drive shaft, and close to the opening 4 is formed a rectangular head insertion opening 5. Although not shown in the drawing, a similar head insertion opening 5 is formed in the upper half case 1a, too.

At the front portion of each of the upper and lower half cases 1a and 1b is formed a slightly depressed recess 6 designed to regulate the sliding movement of the shutter 3. At the central position of this recess 6 opens the magnetic head insertion opening 5.

The magnetic disc 2 comprises a doughnut-shaped flexible magnetic sheet and a metallic or synthetic resin-made center hub passed through and secured in the center hole of the magnetic sheet. The magnetic sheet comprises a base film and magnetic layers formed by coating on both sides of the base film.

The base film is made of a synthetic resin such as polyethylene terephthalate (PET), polyethylene naphthalate (PEN), polyimide or the like. The magnetic layers are composed of a mixture of ferromagnetic powder, binder, abrasive powder, lubricant, etc.

The shutter 3 may be made of, for example, polypropylene or acetal resin.

As shown in FIG. 1, on the surfaces of the cartridge case 1 and the shutter 3 are provided the printing sections 7, where certain necessary indications such as front side and flip side, type of disc cartridge, trade mark, commercial designs, etc., are printed. Screen printing or offset printing may be employed for printing on the sections 7.

Polypropylene is preferably used as material of the cartridge case 1 and/or shutter 3.

In the case of a 3.5 inch cartridge case for instance, its maximum thickness is as small as about 1.5 mm, so that the flow of the molten resin in the mold is not good when using such resins as ABS resin, styrene resin and acrylic resin. Consequently, improper molding may occur or the desired mechanical strength may not be provided at some portions. Also, these resins are not necessarily satisfactory in heat resistance, so that the cartridge case made of any of such resins may undergo a thermal deformation when left under a high temperature.

On the other hand, polypropylene shows good fluidity in the molten state in the mold even on the occasion of thin molding, so that this resin has good moldability and makes it possible to obtain the desired mechanical strength as a whole. Further, polypropylene is resistant to heat, so that the cartridge case made thereof hardly undergoes a thermal deformation even if left under a high temperature.

In case the shutter is molded from acetal resin, the obtained shutter tends to deform when left under a high temperature and high humidity condition, for example a condition of 45° C. and 90% RH, due to the material quality and the small thickness of the molded product. Consequently, when the shutter is set in position on the cartridge case, the free end side of each closing portion of the shutter may rise up (due to deformation) to form a space, and dust and contaminants may enter the cartridge case from such space between each closing portion of the shutter and the cartridge case even when the shutter is at its closed position. Also, since the free end side of each closing portion of the shutter spreads out, the apparent overall height of the disc cartridge increases, so that when the cartridge is loaded in or unloaded from a recording and reproducing device, the closing portions of the shutter may be hindered in moving smoothly, which may further promote deformation of the closing portions of the shutter.

In contrast, the shutter made of polypropylene, because of its low hygroscopicity, is highly resistant to deformation under a high temperature and high humidity condition, such as mentioned above.

The term "polypropylene-made cartridge case or shutter" used in the present specification of the invention means that such a cartridge case or shutter is made of a single polymer of propylene, a copolymer of propylene and ethylene, a copolymer of propylene and other α-olefin of up to 8 carbon atoms, or a mixture thereof.

Examples of the ester compounds of glycerin usable in this invention include glycerin monostearate, glycerin distearate and glycerin tristearate. Of these compounds, glycerin monostearate is the most preferred.

The amine type organic compounds usable in this invention are diverse, but a mixture of N-N-bishydroxyalkylamine such as represented by the following structural formula (1) and a glycerin monoester such as represented by the following structural formula (2) is preferred. The mixing ratio of N-N-bishydroxyalkylamine (A) to glycerin monoester (B) ((A)/(B)) is preferably in the range of 8/2 to 2/8, more preferably 6/4 to 4/6.

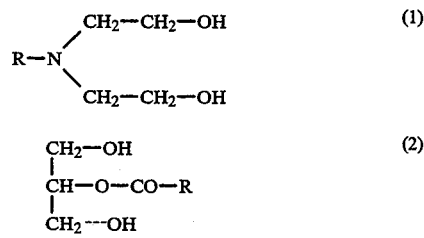

The polypropylene-made shutters were molded by adding various surfactants shown in Table 1 below.

TABLE 1

| Specimen No. | Surfactant |
| --- | --- |
| 1 | glycerin monostearate alone (2%) |
| 2 | glycerin monostearate alone (1%) |
| 3 | glycerin monostearate alone (0.7%) |
| 4 | glycerin monostearate (0.2%)/amine type AS (0.2%) |
| 5 | glycerin monostearate (0.25%)/amine type AS (0.25%) |
| 6 | glycerin monostearate (0.5%)/amine type AS (0.5%) |
| 7 | amine type AS alone (0.5%) |
| 8 | other amine type organic compound (0.3%) |
| 9 | no surfactant added |

In the above table, the "amine type AS" is N-N-bishydroxyalkylamine of the above-shown structural formula (1).

Letters were printed on the surface of each of the shutters by ordinary screen printing. Thereafter, each shutter was kept under a high temperature (45° C.) and high humidity (90% RH) condition for 240 hours and then subjected to a peel test (Scotch tape test) in which an adhesive tape was stuck fast to the printed face of each shutter and it was observed whether peeling took place or not at the printed face when the adhesive tape was peeled from the printed face of each shutter. The results are shown in Table 2.

TABLE 2

| Specimen No. | Test result |
| --- | --- |
| 1 | x |
| 2 | Δ |
| 3 | o |
| 4 | o |
| 5 | o |
| 6 | Δ |

TABLE 2-continued

| Specimen No. | Test result |
|---|---|
| 7 | o |
| 8 | x |
| 9 | o |

In the above table, o mark indicates that in the above peel test, print durability was well above the mark, Δ mark indicates that print durability barely passe the mark, and x mark indicates that print durability was bad.

As seen from the above tables, the shutter made by adding other amine type organic compound (Specimen No. 8) and the one in which glycerin monostearate was used but its adding ratio was 2% (Specimen No. 1) were poor in printability and peeling took place at the printed face in the above peel test. On the other hand, the products according to the examples of this invention (Specimen Nos. 2-6) showed high print durability and suffered no peeling at the printed face in the above peel test.

Then, surface resistivity of each shutter was determined. The surface of each shutter was rubbed with a piece of cloth to have the shutter surface electrically charged. Immediately thereafter, the shutter was placed at a position 1 mm above a layer of cigarette ashes and the amount of ash drawn up by the shutter was measured to thereby evaluate the static charging characteristics in a qualitative way. The results are shown in Table 3.

TABLE 3

| Specimen No. | Surface resistivity ($\Omega$) | Ash adhesion |
|---|---|---|
| 1 | $3.52 \times 10^{11}$ | o |
| 2 | $7.02 \times 10^{12}$ | o |
| 3 | $2.14 \times 10^{14}$ | o |
| 4 | $2.92 \times 10^{16}$ | Δ |
| 5 | $1.77 \times 10^{13}$ | o |
| 6 | $6.58 \times 10^{12}$ | o |
| 7 | $6.90 \times 10^{16}$ | x |
| 8 | $2.71 \times 10^{16}$ | x |
| 9 | $1.00 \times 10^{18}$ | x |

In the above table, o mark indicates that in the above static charging test, no ash adhered on the shutter, Δ mark indicates that a very small amount of ash adhered on the shutter and x mark indicates that ash adhered heavily on the shutter.

It is noted from the above table that the shutter made by adding an amine type AS alone in a low ratio (Specimen No. 7), the one added with other amine type organic compound (Specimen No. 8) and the one containing no surfactant (Specimen No. 9) suffered heavy adhesion of ash, which indicates that these shutters tend to attract dust and contaminants in the air. On the other hand, the shutters produced according to the principle of the present invention were substantially free of ash on their surfaces, indicating their excellent antistatic properties.

Each of the above tests was conducted on the shutters, but it has been experimentally confirmed that the similar effects can be obtained with the cartridge cases according to the present invention.

In the foregoing examples, the discussion has been made concerning magnetic disc cartridge, but it will be recognized that the present invention can as well be applied to other types of disc cartridge, such as photodisc cartridge.

As described above, the present invention has made it possible to improve printability of the cartridge case and the shutter to enhance their commercial quality by adding to their base material an ester compound of glycerin such as glycerin monostearate or a mixture of such an ester compound and an amine type organic compound such as N-N-bishydroxyalkylamine.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disc cartridge comprising a recording disc, a cartridge case in which said recording disc is rotatably housed, said cartridge case including a head insertion opening formed at a predetermined position, and a shutter adapted to open and close said head insertion opening in said cartridge case, said cartridge case and shutter comprising a synthetic resin containing an ester compound of glycerin wherein the content of the ester compound of glycerin is 0.2-1% by weight, said synthetic resin comprising polypropylene.

2. A disc cartridge according to claim 1, wherein said ester compound of glycerin is glycerin monostearate.

3. A disc cartridge according to claim 1, wherein said shutter and said cartridge case further contain an amine type organic compound.

4. A disc cartridge according to claim 3, wherein said ester compound of glycerin is glycerin monostearate.

5. A disc cartridge according to claim 3, wherein said amine type organic compound is N-N-bishydroxyalkylamine.

6. A disc cartridge according to claim 3, wherein a total content of said glycerin ester compound and said amine type organic compound is 0.2-1% by weight.

* * * * *